United States Patent
Nishikawa

(10) Patent No.: US 11,740,512 B2
(45) Date of Patent: Aug. 29, 2023

(54) METHOD OF MANUFACTURING LIQUID CRYSTAL LAYER

(71) Applicant: FUJIFILM Corporation, Tokyo (JP)

(72) Inventor: Hideyuki Nishikawa, Minamiashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/942,889

(22) Filed: Sep. 12, 2022

(65) Prior Publication Data

US 2023/0023006 A1 Jan. 26, 2023

Related U.S. Application Data

(63) Continuation of application No. PCT/JP2021/010174, filed on Mar. 12, 2021.

(30) Foreign Application Priority Data

Mar. 13, 2020 (JP) .................. 2020-043748

(51) Int. Cl.
*G02F 1/1337* (2006.01)
*B32B 37/00* (2006.01)
(Continued)

(52) U.S. Cl.
CPC ...... *G02F 1/133711* (2013.01); *B32B 37/025* (2013.01); *B32B 38/10* (2013.01);
(Continued)

(58) Field of Classification Search
CPC ... B32B 2305/55; B32B 38/10; B32B 43/006; G02F 1/133365; G02F 1/13378;
(Continued)

(56) References Cited

U.S. PATENT DOCUMENTS

| 5,995,184 A | 11/1999 | Chung et al. |
| 2018/0164645 A1 | 6/2018 | Oh et al. |

(Continued)

FOREIGN PATENT DOCUMENTS

| JP | 2010-20331 A | 1/2010 |
| JP | 2013-101262 A | 5/2013 |

(Continued)

OTHER PUBLICATIONS

English translation of description of JP2013246302.*

(Continued)

*Primary Examiner* — Sonya M Sengupta
(74) *Attorney, Agent, or Firm* — Birch, Stewart, Kolasch & Birch, LLP

(57) ABSTRACT

An object is to provide a method of manufacturing a liquid crystal layer in which an alignment film is repeatedly used and a liquid crystal compound in a liquid crystal layer can be sufficiently aligned. The method of manufacturing a liquid crystal layer includes: an alignment film forming step of forming an alignment film on a support; a liquid crystal alignment film alignment step of laminating a first liquid crystal composition including a polymerizable liquid crystal compound on the alignment film and aligning the first liquid crystal composition; a liquid crystal alignment layer forming step of polymerizing the aligned first liquid crystal composition to form a liquid crystal alignment layer; a peeling step of laminating and immobilizing a surface of the liquid crystal alignment layer opposite to the alignment film on an adherend and peeling the liquid crystal alignment layer from the alignment film at an interface between the liquid crystal alignment layer and the alignment film; a liquid crystal layer alignment step of laminating a second liquid crystal composition including a polymerizable liquid crystal compound on a surface of the liquid crystal alignment layer from which (Continued)

the alignment film is peeled off and aligning the second liquid crystal composition; a liquid crystal layer forming step of polymerizing the aligned second liquid crystal composition to form a liquid crystal layer; and a liquid crystal layer separation step of separating the formed liquid crystal layer from the liquid crystal alignment layer, in which the liquid crystal layer alignment step to the liquid crystal layer separation step are repeated to repeatedly prepare the liquid crystal layer.

15 Claims, 9 Drawing Sheets

(51) Int. Cl.
 B32B 38/10 (2006.01)
 C09K 19/04 (2006.01)
 B32B 43/00 (2006.01)
(52) U.S. Cl.
 CPC ........ *C09K 19/0403* (2013.01); *B32B 43/006* (2013.01); *B32B 2307/40* (2013.01); *C09K 2019/0407* (2013.01); *C09K 2323/02* (2020.08); *Y10T 156/1994* (2015.01)
(58) Field of Classification Search
 CPC ......... G02F 1/133788; G02F 2202/023; Y10T 156/1153; Y10T 156/1158; Y10T 156/1195; Y10T 156/1911; Y10T 156/1917; Y10T 156/1994; G02B 27/017; G02B 27/0172; C09K 19/00; C09K 2323/02
 See application file for complete search history.

(56) References Cited

U.S. PATENT DOCUMENTS

2020/0326590 A1  10/2020  Shibata et al.
2021/0149255 A1   5/2021  Sato et al.

FOREIGN PATENT DOCUMENTS

| JP | 2013-246302 A | 12/2013 |
| JP | 2015-89838 A | 5/2015 |
| JP | 2020-502565 A | 1/2020 |
| WO | WO 2019/131943 A | 7/2019 |
| WO | WO 2020/022513 A1 | 1/2020 |

OTHER PUBLICATIONS

English translation of description of JP2015089638.*
English translation of description of JP2020502565.*
English translation of description of WO2019131943.*
English translation of description of WO2020022513.*
International Preliminary Report on Patentability, dated Sep. 22, 2022, and Written Opinion of the International Searching Authority, dated May 25, 2021, for International Application No. PCT/JP2021/010174, with an English translation.
International Search Report for International Application No. PCT/JP2021/010174, dated May 25, 2021, with an English translation.

* cited by examiner

METHOD OF MANUFACTURING LIQUID CRYSTAL LAYER

CROSS-REFERENCE TO RELATED APPLICATIONS

This application is a Continuation of PCT International Application No. PCT/JP2021/010174 filed on Mar. 12, 2021, which claims priority under 35 U.S.C. § 119(a) to Japanese Patent Application No. 2020-043748 filed on Mar. 13, 2020. The above application is hereby expressly incorporated by reference, in its entirety, into the present application.

BACKGROUND OF THE INVENTION

1. Field of the Invention

The present invention relates to a method of manufacturing a liquid crystal layer.

2. Description of the Related Art

A liquid crystal layer that is formed of a liquid crystal composition including a liquid crystal compound is used as various liquid crystal layers such as a diffraction element, an optically-anisotropic layer, or a wavelength selective reflecting layer. In the liquid crystal layer, the liquid crystal compound is aligned to a predetermined alignment state such that various actions such as diffraction, phase difference imparting, or selective wavelength reflection are exhibited.

In order to align the liquid crystal compound in the liquid crystal layer, an alignment film is used. For example, the liquid crystal compound in the liquid crystal composition is aligned to a predetermined alignment state by applying the liquid crystal composition for forming the liquid crystal layer to the alignment film formed on a support and aligning the applied liquid crystal composition, and the liquid crystal layer is formed by curing the aligned liquid crystal composition.

Incidentally, in order to prepare the liquid crystal layer with higher productivity, it is presumed that, after preparing the liquid crystal layer, the liquid crystal layer is separated from the alignment film to reuse the alignment film.

For example, JP2020-502565A describes a process for patterning a liquid crystal polymer layer, the process including: bringing a liquid crystal polymer layer and a reusable alignment template having a surface alignment pattern into contact with each other such that liquid crystal molecules of the liquid crystal polymer layer are aligned to the surface alignment pattern of the reusable alignment template primarily via chemical, steric, or other intermolecular interaction; polymerizing the liquid crystal polymer layer; and delaminating the patterned polymerized liquid crystal polymer layer from the reusable alignment template, in which the reusable alignment template includes a photoalignment layer having the surface alignment pattern.

JP2020-502565A describes a configuration in which the liquid crystal polymer layer is formed on the photoalignment layer (alignment film) such that the polymerized liquid crystal polymer layer is aligned using the alignment of the liquid crystal compound in the liquid crystal polymer layer (liquid crystal alignment layer). JP2020-502565A describes that light and heat stability is improved with the configuration in which the liquid crystal polymer layer is formed on the alignment film.

SUMMARY OF THE INVENTION

In JP2020-502565A, in the configuration where the liquid crystal alignment layer is formed on the alignment film and the liquid crystal layer is aligned by the liquid crystal alignment layer, a peelable layer is provided between the liquid crystal alignment layer and the liquid crystal layer in order to peel off the liquid crystal alignment layer and the liquid crystal layer from each other. However, in a case where the peelable layer is present between the liquid crystal alignment layer and the liquid crystal layer, the peeling is performed through the peelable layer. Therefore, there is a problem in that the alignment of the formed liquid crystal layer is not sufficient. In addition, on a surface of the liquid crystal alignment layer opposite to the alignment film, the aligning properties of the liquid crystal compound are low. Therefore, in a case where the liquid crystal layer is formed on the surface of the liquid crystal alignment layer opposite to the alignment film, there is a problem in that the alignment of the liquid crystal layer is not sufficient. In particular, in a case where the liquid crystal compound in the liquid crystal layer is aligned in a smaller period pattern, there is a problem in that the liquid crystal compound in the liquid crystal layer cannot be sufficiently aligned.

An object of the present invention is to solve the above-described problem of the related art and to provide a method of manufacturing a liquid crystal layer in which an alignment film is repeatedly used and a liquid crystal compound in a liquid crystal layer can be sufficiently aligned.

In order to achieve the object, the present invention has the following configurations.

[1] A method of manufacturing a liquid crystal layer comprising:

an alignment film forming step of forming an alignment film on a support;

a liquid crystal alignment layer alignment step of laminating a first liquid crystal composition including a polymerizable liquid crystal compound on the alignment film and aligning the first liquid crystal composition;

a liquid crystal alignment layer forming step of polymerizing the aligned first liquid crystal composition to form a liquid crystal alignment layer;

a peeling step of laminating and immobilizing a surface of the liquid crystal alignment layer opposite to the alignment film on an adherend and peeling the liquid crystal alignment layer from the alignment film at an interface between the liquid crystal alignment layer and the alignment film;

a liquid crystal layer alignment step of laminating a second liquid crystal composition including a polymerizable liquid crystal compound on a surface of the liquid crystal alignment layer from which the alignment film is peeled off and aligning the second liquid crystal composition;

a liquid crystal layer forming step of polymerizing the aligned second liquid crystal composition to form a liquid crystal layer; and a liquid crystal layer separation step of separating the formed liquid crystal layer from the liquid crystal alignment layer, in which the liquid crystal layer alignment step to the liquid crystal layer separation step are repeated to repeatedly prepare the liquid crystal layer.

[2] The method of manufacturing a liquid crystal layer according to [1],
wherein in the liquid crystal layer alignment step, the liquid crystal alignment layer brings a direction of an optical axis derived from the liquid crystal compound in the liquid crystal layer into an alignment state of changing while continuously rotating in at least one in-plane direction.

[3] The method of manufacturing a liquid crystal layer according to [1] or [2], in which the alignment film formed in the alignment film forming step is formed of a photo-alignment composition including an azobenzene compound.

[4] The method of manufacturing a liquid crystal layer according to any one of [1] to [3],
in which in the alignment film forming step, the alignment film is exposed by laser interference exposure.

[5] The method of manufacturing a liquid crystal layer according to any one of [1] to [4],
in which the first liquid crystal composition includes a polyfunctional polymerizable compound.

[6] The method of manufacturing a liquid crystal layer according to [5],
in which the polymerizable liquid crystal compound in the first liquid crystal composition is a polyfunctional polymerizable liquid crystal compound.

According to the present invention, it is possible to provide a method of manufacturing a liquid crystal layer in which an alignment film is repeatedly used and a liquid crystal compound in a liquid crystal layer can be sufficiently aligned.

DESCRIPTION OF THE PREFERRED EMBODIMENTS

Hereinafter, a method of manufacturing a liquid crystal layer according to an embodiment of the present invention will be described in detail based on preferred embodiments shown in the accompanying drawings.

In the present specification, numerical ranges represented by "to" include numerical values before and after "to" as lower limit values and upper limit values.

In the present specification, "(meth)acrylate" represents "either or both of acrylate and methacrylate."

In the present specification, the meaning of "identical" or "the same" includes a case where an error range is generally allowable in the technical field.

[Method of Manufacturing Liquid Crystal Layer]

The method of manufacturing a liquid crystal layer according to the embodiment of the present invention comprises:

an alignment film forming step of forming an alignment film on a support;

a liquid crystal alignment layer alignment step of laminating a first liquid crystal composition including a polymerizable liquid crystal compound on the alignment film and aligning the first liquid crystal composition;

a liquid crystal alignment layer forming step of polymerizing the aligned first liquid crystal composition to form a liquid crystal alignment layer;

a peeling step of laminating and immobilizing a surface of the liquid crystal alignment layer opposite to the alignment film on an adherend and peeling the liquid crystal alignment layer and the alignment film from each other at an interface between the liquid crystal alignment layer and the alignment film;

a liquid crystal layer alignment step of laminating a second liquid crystal composition including a polymerizable liquid crystal compound on a surface of the liquid crystal alignment layer from which the alignment film is peeled off and aligning the second liquid crystal composition;

a liquid crystal layer forming step of polymerizing the aligned second liquid crystal composition to form a liquid crystal layer; and a liquid crystal layer separation step of separating the formed liquid crystal layer from the liquid crystal alignment layer, in which the liquid crystal layer alignment step to the liquid crystal layer separation step are repeated to repeatedly prepare the liquid crystal layer.

One example of the method of manufacturing a liquid crystal layer according to the embodiment of the present invention will be described using FIGS. 1 to 8.

[Alignment Film Forming Step]

Figure 1:
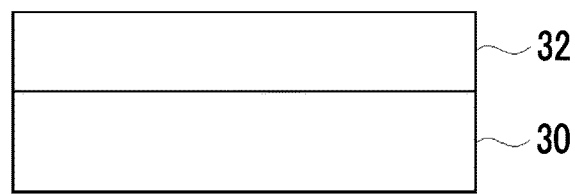
FIG. 1 is a conceptual diagram showing an example of a method of manufacturing a liquid crystal layer according to the present invention.

As shown in FIG. 1, the alignment film forming step is a step of forming an alignment film 32 on a support 30.

As a method of forming the alignment film, a well-known method of forming an alignment film in the related art that is used for forming a liquid crystal layer can be used depending on a material for forming the alignment film.

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as co-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32 formed by the rubbing treatment, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

In the present invention, the alignment film 32 is suitably used as a so-called photo-alignment film obtained by irradiating a photo-alignment material with polarized light or non-polarized light. That is, in the present invention, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

In the present invention, it is preferable that the alignment film formed in the alignment film forming step is formed of a photo-alignment composition including an azobenzene compound.

The azobenzene compound is a compound having an azobenzene group as a photoreactive group.

The azobenzene compound is not particularly limited and is preferably a compound represented by Formula (I).

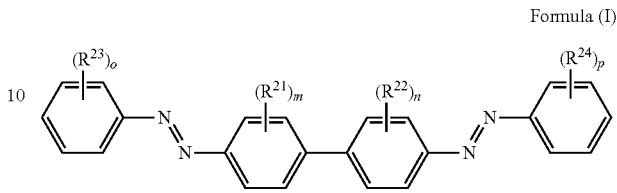

Formula (I)

$R^{21}$ to $R^{24}$ each independently represent a hydrogen atom or a substituent. In this case, at least one of the groups represented by $R^{21}$ to $R^{24}$ is a carboxyl group or a salt thereof or a sulfo group or a salt thereof, m represents an integer of 1 to 4, n represents an integer of 1 to 4, o represents an integer of 1 to 5, and p represents an integer of 1 to 5. In a case where m, n, o, and p represent an integer of 2 or more, a plurality of $R^{21}$'s to $R^{24}$'s may be the same as or different from each other.

Examples of the substituent represented by each of $R^{21}$ to $R^{24}$ in Formula (I) include a carboxyl group or a salt thereof (examples of the salt of the carboxyl group include a salt of alkali metal, and a sodium salt is preferable), a sulfo group or a salt thereof (examples of the salt of the sulfo group include a salt of alkali metal, and a sodium salt is preferable), an alkyl group, an alkenyl group, an alkynyl group, an aryl group, a substituted or unsubstituted amino group, an alkoxy group, an alkoxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoric amide group, a hydroxy group, a mercapto group, a halogen atom, a cyano group, a nitro group, a hydroxamic acid group, a sulfino group, a hydrazino group, an imino group, a heterocyclic group, and a silyl group.

The substituents may be further substituted with the substituents. In addition, in a case where two or more substituents are present, the substituents may be the same as or different from each other. In addition, if possible, the substituents may be bonded to each other to form a ring.

As the group represented by $R^{21}$ to $R^{24}$ in Formula (I), a hydrogen atom, a carboxyl group or a salt thereof, a sulfo group or a salt thereof, a halogen atom, an alkyl group, an alkoxy group, a cyano group, a nitro group, an alkoxycarbonyl group, or a carbamoyl group is preferable, a hydrogen atom, a carboxyl group or a salt thereof, a sulfo group or a salt thereof, a halogen atom, a methyl halide group, a methoxy halide group, a cyano group, a nitro group, or a methoxycarbonyl group is more preferable, and a hydrogen atom, a carboxyl group or a salt thereof, a sulfo group or a salt thereof, a halogen atom, a cyano group, or a nitro group is still more preferable.

In this case, at least one of the groups represented by $R^{21}$ to $R^{24}$ is a carboxyl group or a salt thereof or a sulfo group or a salt thereof. The substitution site of the carboxyl group or a salt thereof or the sulfo group or a salt thereof is not particularly limited. From the viewpoint of photoactivity, it is preferable that at least one $R^{21}$ and/or at least one $R^{22}$ represents a sulfo group or a salt thereof, and it is more preferable that at least one $R^{21}$ and at least one $R^{22}$ represent a sulfo group or a salt thereof. In addition, from the same viewpoint, it is preferable that at least one $R^{23}$ and/or at least one $R^{24}$ represents a carboxyl group or a salt thereof, and it is more preferable that at least one $R^{23}$ and at least one $R^{24}$ represent a carboxyl group or a salt thereof. It is still more preferable that the carboxyl group or a salt thereof is $R^{23}$ and $R^{24}$ substituted at the meta position with respect to the azo group.

In Formula (I), m represents an integer of 1 to 4, n represents an integer of 1 to 4, o represents an integer of 1 to 5, and p represents an integer of 1 to 5. It is preferable that m represents an integer of 1 to 2, n represents an integer of 1 to 2, o represents an integer of 1 to 2, and p represents an integer of 1 to 2.

Hereinafter, specific examples of the compound represented by Formula (I) will be shown, but the present invention is not limited to the following specific examples.

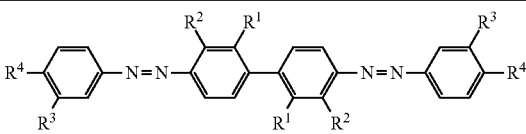

| No. | $R^1$ | $R^2$ | $R^3$ | $R^4$ |
|---|---|---|---|---|
| E-1 | —SO$_3$Na | —H | —COOH | —OH |
| E-2 | —H | —SO$_3$Na | —COOH | —OH |
| E-3 | —SO$_3$Na | —H | —COONa | —OH |
| E-4 | —H | —SO$_3$Na | —COONa | —OH |
| E-5 | —CH$_3$ | —H | —COONa | —OH |
| E-6 | —H | —CH$_3$ | —COONa | —OH |
| E-7 | —H | —OCH$_3$ | —COONa | —OH |
| E-8 | —H | —OCF$_3$ | —COONa | —OH |
| E-9 | —H | —Cl | —COONa | —OH |
| E-10 | —H | —CN | —COONa | —OH |
| E-11 | —H | —NO$_2$ | —COONa | —OH |
| E-12 | —COOCH$_3$ | —H | —COONa | —OH |
| E-13 | —CONH$_2$ | —H | —COONa | —OH |
| E-14 | —SO$_2$NH$_2$ | —H | —COONa | —OH |
| E-15 | —SO$_3$Na | —H | —COONa | —OH |
| E-16 | —SO$_3$Na | —H | —CH$_2$OH | —OH |
| E-17 | —H | —SO$_3$Na | —CH$_2$OH | —OH |

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the photo-alignment film is not limited. Any one of various well-known methods corresponding to a material for forming the photo-alignment film can be used. For example, a method including: applying the photo-alignment film 32 to a surface of the support 30; drying the applied photo-alignment film 32; and exposing the photo-alignment film 32 to laser light to form an alignment pattern can be used.

Figure 2:
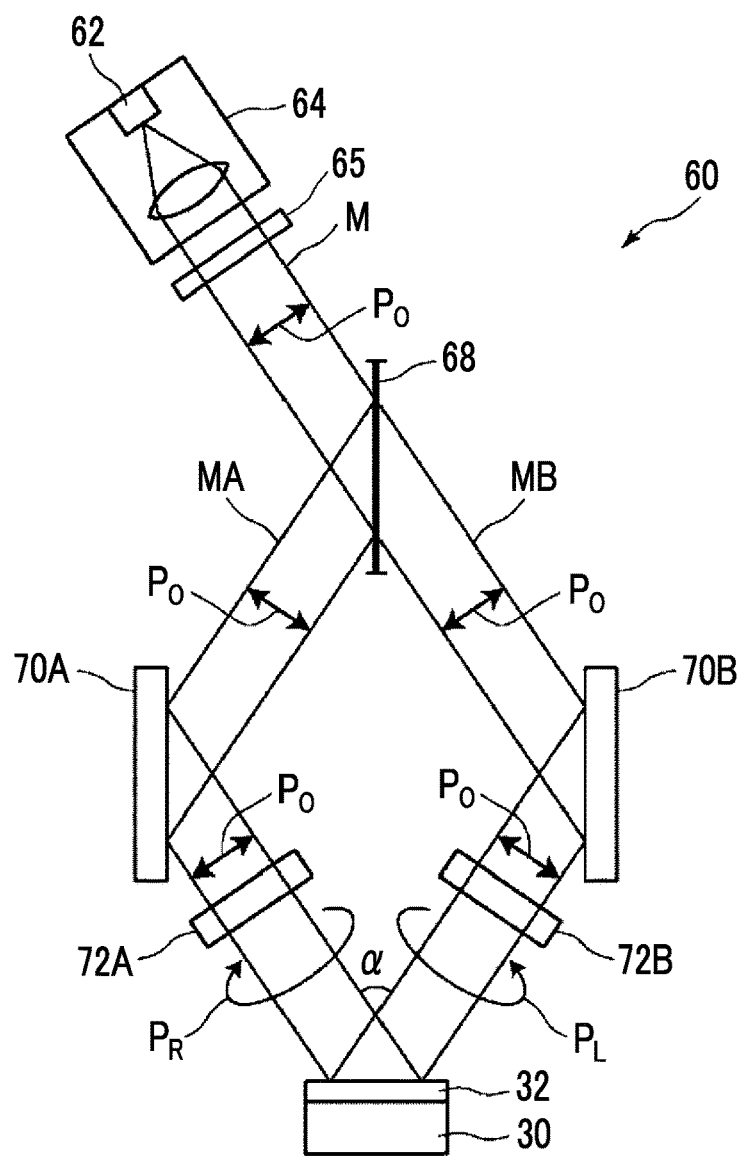
FIG. 2 is a conceptual diagram showing an example of an exposure device that exposes an alignment film.

FIG. 2 conceptually shows an example of an exposure device that exposes the alignment film 32 to form an alignment pattern.

An exposure device 60 shown in FIG. 2 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the split two beams MA and MB; and λ/4 plates 72A and 72B.

The light source 64 emits linearly polarized light P$_0$. The λ/4 plate 72A converts the linearly polarized light P$_0$ (beam MA) into right circularly polarized light P$_R$, and the λ/4 plate 72B converts the linearly polarized light P$_0$ (beam MB) into left circularly polarized light P$_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which an optical axis 40A derived from a liquid crystal compound 40 in a liquid crystal layer 34 described below continuously rotates in one in-plane direction, a length of a single period over which the optical axis 40A rotates by 180° in the one in-plane direction in which the optical axis 40A rotates can be adjusted.

By forming the liquid crystal layer on the alignment film 32 having the alignment pattern in which the alignment state periodically changes, as described below, the liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the direction of the optical axis of the liquid crystal compound in the liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the liquid crystal layer has the liquid crystal alignment pattern in which the direction of the optical axis 40A derived from the liquid crystal compound 40 changes while continuously rotating in at least one in-plane direction.

That is, in the present invention, the support 30 may be made to function as the alignment film.

<Support>

The support 30 supports the alignment film 32 and the liquid crystal layer 34.

As the support 30, various sheet-shaped materials (films or plate-shaped materials) can be used as long as they can support the alignment film 32 and the liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on a material for forming the support 30 and the like in a range where the alignment film 32 and the liquid crystal layer 34 can be supported.

The thickness of the support 30 is preferably 1 to 2000 µm, more preferably 3 to 500 µm, and still more preferably 5 to 250 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

[Liquid Crystal Alignment Layer Alignment Step]

The liquid crystal alignment layer alignment step is a step of laminating a first liquid crystal composition including a polymerizable liquid crystal compound on the alignment film and aligning the first liquid crystal composition. In the liquid crystal alignment layer alignment step, the first liquid crystal composition is applied to the alignment film 32 and the liquid crystal compound is aligned to a state of a desired liquid crystal phase.

For the application of the first liquid crystal composition, a printing method such as ink jet or scroll printing or a well-known method such as spin coating, bar coating, or spray coating capable of uniformly applying liquid to a sheet-shaped material can be used.

Optionally by drying and/or heating the applied first liquid crystal composition, the liquid crystal compound in the first liquid crystal composition is aligned to a predetermined alignment state in the alignment pattern of the alignment film 32. In the case of heating, the heating temperature is preferably 200° C. or lower and more preferably 130° C. or lower.

[Liquid Crystal Alignment Layer Forming Step]

The liquid crystal alignment layer forming step is a step of polymerizing the aligned first liquid crystal composition to form a liquid crystal alignment layer.

Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

Figure 3:
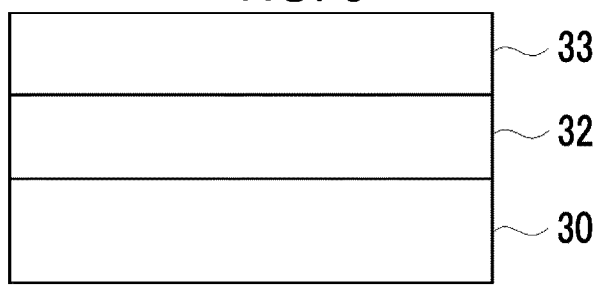
FIG. 3 is a conceptual diagram showing an example of the method of manufacturing a liquid crystal layer according to the present invention.

Through the liquid crystal alignment layer alignment step and the liquid crystal alignment layer forming step, a liquid crystal alignment layer 33 is formed as shown in FIG. 3.

Here, in the present invention, in at least a region of a surface of the liquid crystal alignment layer 33 on the alignment film 32 side, as long as the liquid crystal compound is aligned in the alignment pattern of the alignment film 32, the liquid crystal alignment layer 33 may be in any alignment state in a thickness direction. For example, the liquid crystal alignment layer 33 may be in a homogeneously aligned state or a cholesteric alignment state. Alternatively, the liquid crystal alignment layer 33 may be in a non-aligned state in the thickness direction.

<First Liquid Crystal Composition>

The first liquid crystal composition includes a polymerizable liquid crystal compound and may further include a surfactant, a chiral agent, a polymerization initiator, a cross-linking agent, other additives, or a solvent. In addition, it is preferable that the first liquid crystal composition includes a polyfunctional polymerizable compound. It is preferable that the polymerizable liquid crystal compound is a polyfunctional polymerizable liquid crystal compound.

—Polymerizable Liquid Crystal Compound—

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

Further, it is preferable that the liquid crystal compound is a polyfunctional polymerizable liquid crystal compound.

The polyfunctional polymerizable liquid crystal compound is a liquid crystal compound having a plurality of polymerizable groups. The kind of the polymerizable groups is as described above.

The number of the polymerizable groups in the polyfunctional polymerizable liquid crystal compound is 2 or more and preferably 2 to 6.

The polyfunctional polymerizable liquid crystal compound may be a disk-like liquid crystal compound or a rod-like liquid crystal compound as long as it has a plurality of polymerizable groups.

In addition, the addition amount of the polymerizable liquid crystal compound in the first liquid crystal composition is preferably 75 to 99.9 mass %, more preferably 80 to 99 mass %, and still more preferably 85 to 90 mass % with respect to the solid content mass (mass excluding a solvent) of the first liquid crystal composition.

—Surfactant—

The first liquid crystal composition may include a surfactant.

It is preferable that the surfactant is a compound that can function as an alignment control agent contributing to the stable or rapid alignment of a liquid crystal phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the first liquid crystal composition is preferably 0.01 to 10 mass %, more preferably 0.01 to 5 mass %, and still more preferably 0.02 to 1 mass % with respect to the total mass of the first liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

The chiral agent may have a photoisomerization group. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the first liquid crystal composition is preferably 0.01 to 200 mol % and more preferably 1 to 30 mol % with respect to the content molar amount of the first liquid crystal compound.

—Polymerization Initiator—

In a case where the first liquid crystal composition includes a polymerizable compound, it is preferable that the first liquid crystal composition includes a polymerization initiator. In an aspect where a polymerization reaction progresses with ultraviolet irradiation, it is preferable that the polymerization initiator is a photopolymerization initiator which can initiate a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the first liquid crystal composition is preferably 0.1 to 20 mass % and more preferably 0.5 to 12 mass % with respect to the content of the first liquid crystal compound.

—Crosslinking Agent—

In order to improve the film hardness after curing and to improve durability, the first liquid crystal composition may include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the first liquid crystal composition. In a case where the content of the crosslinking agent is in the above-described range, an effect of improving a crosslinking density can be easily obtained, and the stability of a liquid crystal phase is further improved.

—Other Additives—

Optionally, a polymerization inhibitor, an antioxidant, an ultraviolet absorber, a light stabilizer, a coloring material, metal oxide fine particles, or the like can be added to the first liquid crystal composition in a range where optical performance and the like do not deteriorate.

—Solvent—

In a case where the first liquid crystal layer is formed, it is preferable that the first liquid crystal composition is used as liquid.

The first liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

[Peeling Step]

Figure 4:
FIG. 4 is a conceptual diagram showing an example of the method of manufacturing a liquid crystal layer according to the present invention.
Figure 5:
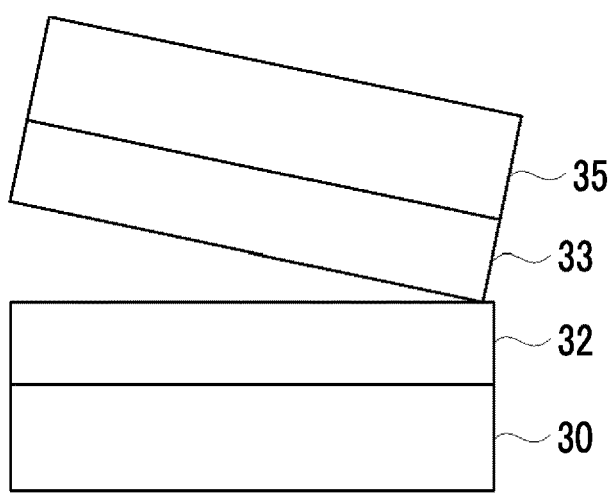
FIG. 5 is a conceptual diagram showing an example of the method of manufacturing a liquid crystal layer according to the present invention.

The peeling step is a step of laminating and immobilizing an adherend 35 on a surface of the liquid crystal alignment layer 33 opposite to the alignment film 32 as shown in FIG. 4 and peeling the liquid crystal alignment layer 33 from the alignment film 32 at an interface between the liquid crystal alignment layer 33 and the alignment film 32 as shown in FIG. 5.

As the adherend 35, various well-known materials such as a film obtained by forming a pressure-sensitive adhesive layer having a weak adhesive force on a resin film can be used.

Examples of the various well-known materials include: a so-called laminate film (protective films) that is used for protection of various materials and products, for example, protection of display screens of display devices, protection of surfaces of various film products, or protection of surfaces of home electric appliances; and a film for transfer that is used for bonding a film (layer) formed on a support having a weak adhesive force and peeling the film from the support to bond (peel and transfer) the film to another support having a strong adhesive force.

In addition, it is preferable that the adherend 35 is a film-like material having flexibility. By using the film-like adherend 35 having flexibility, the workability of peeling can be improved.

In addition, in a case where the adherend 35 does not include a pressure-sensitive adhesive layer, the adherend 35 may be laminated and immobilized to the liquid crystal alignment layer 33 using a pressure sensitive adhesive, an adhesive, a pressure sensitive adhesive tape, or the like.

The pressure sensitive adhesive and the adhesive are not limited as long as the adherend 35 and the liquid crystal alignment layer 33 can adhere to each other, and various well-known pressure sensitive adhesives and adhesives that are used in an optical film can be appropriately used.

As the adhesive, for example, one kind or a combination of two or more kinds selected from an aqueous adhesive, an active energy ray-curable adhesive, a pressure sensitive adhesive, and the like can be used. Examples of the aqueous adhesive include a polyvinyl alcohol resin aqueous solution and an aqueous two-component urethane emulsion adhesive. The active energy ray-curable adhesive is, for example, an adhesive that is curable by irradiation of an active energy ray such as ultraviolet light, and examples thereof include an adhesive including a polymerizable compound and a photopolymerization initiator and an adhesive including a photoreactive resin, and an adhesive including a binder resin and a photoreactive crosslinking agent. Examples of the polymerizable compound include a photopolymerizable monomer such as a photocurable epoxy monomer, a photocurable acrylic monomer, or a photocurable urethane monomer, and an oligomer derived from the monomers. Examples of the photopolymerization initiator include an initiator including a material that generates an active species such as a neutral radical, an anion radical, or a cation radical by irradiation of an active energy ray such as ultraviolet light.

Examples of the pressure sensitive adhesive include a composition in which a crosslinking agent such as an isocyanate compound, an epoxy compound, or an aziridine compound is added to a base polymer such as a (meth)acrylic resin, a styrene resin, or a silicone resin.

A method of peeling the liquid crystal alignment layer 33 from the alignment film 32 at the interface between the liquid crystal alignment layer 33 and the alignment film 32 is not limited, and various well-known methods can be used.

As the photo-alignment film formed of the photo-alignment material, in particular, as a photo-alignment film formed of an azo-based photo-alignment material as the photo-alignment material, adhesiveness with the liquid crystal layer including the liquid crystal compound as a major component is low. Therefore, by bonding the adherend 35 to the liquid crystal alignment layer 33 and peeling off the adherend 35, the liquid crystal alignment layer 33 can be easily peeled off from the alignment film 32.

Figure 6:
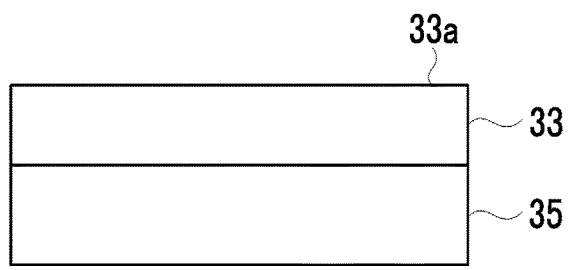
FIG. 6 is a conceptual diagram showing an example of the method of manufacturing a liquid crystal layer according to the present invention.

In the present invention, the alignment of the liquid crystal layer 34 described below is performed using a surface 33a of the peeled liquid crystal alignment layer 33 from which the alignment film 32 is peeled off as shown in FIG. 6. On the surface 33a, the liquid crystal compound is aligned in the alignment pattern of the alignment film 32.

[Liquid Crystal Layer Alignment Step]

The liquid crystal layer alignment step is a step of laminating a second liquid crystal composition including a polymerizable liquid crystal compound on a surface of the liquid crystal alignment layer from which the alignment film is peeled off and aligning the second liquid crystal composition. In the liquid crystal layer alignment step, the second liquid crystal composition is applied to the surface 33a of the liquid crystal alignment layer 33 and the liquid crystal compound is aligned to a state of a desired liquid crystal phase.

For the application of the second liquid crystal composition, a printing method such as ink jet or scroll printing or a well-known method such as spin coating, bar coating, or spray coating capable of uniformly applying liquid to a sheet-shaped material can be used.

Optionally by drying and/or heating the applied second liquid crystal composition, the liquid crystal compound in the second liquid crystal composition is aligned to a predetermined alignment state in the alignment pattern formed on the surface 33a of the liquid crystal alignment layer 33. In the case of heating, the heating temperature is preferably 200° C. or lower and more preferably 130° C. or lower.

[Liquid Crystal Layer Forming Step]

The liquid crystal layer forming step is a step of polymerizing the aligned second liquid crystal composition to form a liquid crystal layer.

Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

Figure 7:
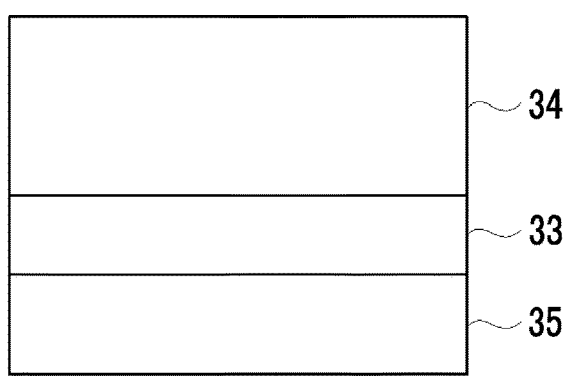
FIG. 7 is a conceptual diagram showing an example of the method of manufacturing a liquid crystal layer according to the present invention.

Through the liquid crystal layer alignment step and the liquid crystal layer forming step, the liquid crystal layer 34 is formed as shown in FIG. 7.

As the second liquid crystal composition, the same composition as the above-described first liquid crystal composition can be used. The first liquid crystal composition and the second liquid crystal composition may be the same as or different from each other.

[Liquid Crystal Layer Separation Step]

Figure 8:
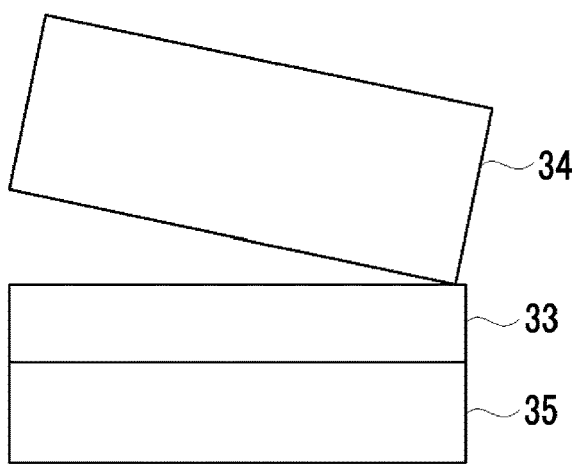
FIG. 8 is a conceptual diagram showing an example of the method of manufacturing a liquid crystal layer according to the present invention.

The liquid crystal layer separation step is a step of separating the formed liquid crystal layer 34 from the liquid crystal alignment layer 33 as shown in FIG. 8. A method of separating the liquid crystal layer 34 from the liquid crystal alignment layer 33 is not limited, and various well-known methods can be used.

For example, as in the above-described peeling step, a film for transfer or the like may be bonded to the liquid crystal layer 34 such that the liquid crystal layer 34 is peeled off from the liquid crystal alignment layer 33 together with the film for transfer. In this case, it is preferable that an adhesive force between the liquid crystal alignment layer 33 and the adherend 35 and an adhesive force between the liquid crystal layer 34 and the film for transfer are higher than an adhesion force between the liquid crystal alignment layer 33 and the liquid crystal layer 34.

The adhesion force between the liquid crystal alignment layer 33 and the liquid crystal layer 34 can be reduced by selecting a system (material) where a covalent bond is not formed or is not likely to be formed at the interface between the liquid crystal alignment layer 33 and the liquid crystal layer 34 and performing a treatment. For example, a polymerization system for the liquid crystal alignment layer 33 and the liquid crystal layer 34 is used. Specifically, for example, an acrylate material is used as one material, and an epoxy material is used as another material. In addition, for example, even in a case where the same polymerization system (for example, an acrylate) is used, a treatment for inhibiting an acrylate from remaining such as a halogenation treatment may be performed on the surface of the liquid crystal alignment layer 33.

Through the above-described steps, the liquid crystal layer 34 can be prepared.

Here, in the method of manufacturing a liquid crystal layer according to the embodiment of the present invention, the liquid crystal layer alignment step to the liquid crystal layer separation step can be repeated to repeatedly prepare the liquid crystal layer 34. As a result, the alignment film does not need to be formed for each of the liquid crystal layers, and the productivity can be improved. In particular, in a case where the alignment pattern is formed by performing laser interference exposure on the alignment film, an exposure time of about 5 minutes is required for a region of about 5 square centimeter, and the productivity is very low. However, by forming the liquid crystal layer using the liquid crystal alignment layer as in the present invention, the alignment film does not need to be exposed for the preparation of each of the liquid crystal layers, and the productivity can be improved.

As described above, in a case where the alignment film is reused, a configuration where a peelable layer is provided between the liquid crystal alignment layer and the liquid crystal layer in order to peel off the liquid crystal alignment layer and the liquid crystal layer from each other may be assumed. In a case where the peelable layer is present between the liquid crystal alignment layer and the liquid crystal layer, the peeling is performed through the peelable layer. Therefore, there is a problem in that the alignment of the formed liquid crystal layer is not sufficient. In addition, on a surface of the liquid crystal alignment layer opposite to the alignment film, the aligning properties of the liquid crystal compound are low. Therefore, in a case where the liquid crystal layer is formed on the surface of the liquid crystal alignment layer opposite to the alignment film, there is a problem in that the alignment of the liquid crystal layer is not sufficient. In particular, in a case where the liquid crystal compound in the liquid crystal layer is aligned in a smaller period pattern, there is a problem in that the liquid crystal compound in the liquid crystal layer cannot be sufficiently aligned.

On the other hand, in the method of manufacturing a liquid crystal layer according to the embodiment of the present invention, the liquid crystal layer 34 is formed on the surface 33a of the liquid crystal alignment layer 33 from which the alignment film 32 is peeled off. On the surface 33a of the liquid crystal alignment layer 33 from which the alignment film 32 is peeled off, the aligning properties of the liquid crystal compound are high. Therefore, by forming the liquid crystal layer 34 on the surface 33a, the liquid crystal layer 34 can be sufficiently aligned. In addition, no peelable layer is provided between the liquid crystal alignment layer 33 and the liquid crystal layer 34. Therefore, the aligning properties of the liquid crystal layer 34 can be prevented from being decreased by the peelable layer.

Here, in the present invention, it is preferable that the alignment film formed in the alignment film forming step is formed of a photo-alignment composition including an azobenzene compound. The alignment film formed of the azobenzene compound can further improve aligning properties. Therefore, the aligning properties of the liquid crystal alignment layer can be further improved, and the aligning properties of the prepared liquid crystal layer can be improved. In addition, in a case where the liquid crystal layer is repeatedly prepared multiple times, the aligning properties of the liquid crystal alignment layer deteriorate slowly, but the original aligning properties of the liquid crystal alignment layer are high. Therefore, a larger number of liquid crystal layers having aligning properties at a given level or higher can be prepared.

In addition, in the present invention, it is preferable that the first liquid crystal composition includes a polyfunctional polymerizable liquid crystal compound. That is, it is preferable that the polymerizable liquid crystal compound in the first liquid crystal composition is polyfunctional polymerizable. The first liquid crystal composition for forming the liquid crystal alignment layer includes the polyfunctional polymerizable liquid crystal compound such that the strength of the liquid crystal alignment layer can be increased. As a result, in a case where the liquid crystal layer is repeatedly prepared, the liquid crystal alignment layer is not likely to deteriorate, and a larger number of liquid crystal layers can be prepared.

Hereinafter, the liquid crystal layer according to the embodiment of the present invention that is manufactured using the manufacturing method according to the embodiment of the present invention will be described.

<Liquid Crystal Layer>

Examples of the liquid crystal layer will be described using FIGS. 9 to 11.

Figure 9:
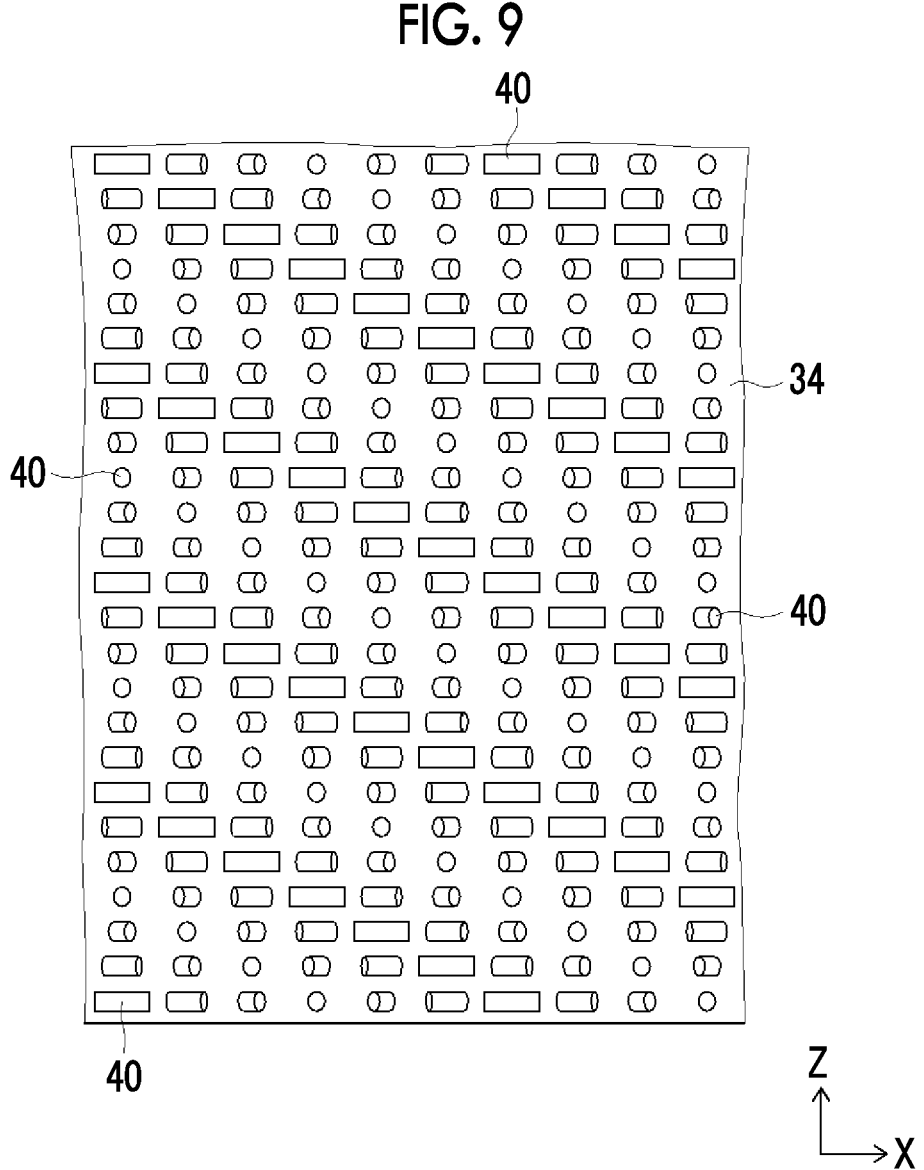
FIG. 9 is a diagram conceptually showing an example of the liquid crystal layer.

FIG. 9 is a conceptual diagram showing the cholesteric liquid crystal layer 34. FIG. 10 is a schematic diagram showing an alignment state of the liquid crystal compound in a plane of a main surface of the cholesteric liquid crystal layer 34 shown in FIG. 9.

In the following description, it is assumed that a main surface of the cholesteric liquid crystal layer 34 is an X-Y plane and a cross-section perpendicular to the X-Y plane is an X-Z plane. That is, FIG. 9 corresponds to a schematic diagram of the X-Z plane of the cholesteric liquid crystal layer 34, and FIG. 10 corresponds to a schematic diagram of the X-Y plane of the cholesteric liquid crystal layer 34.

Figure 10:
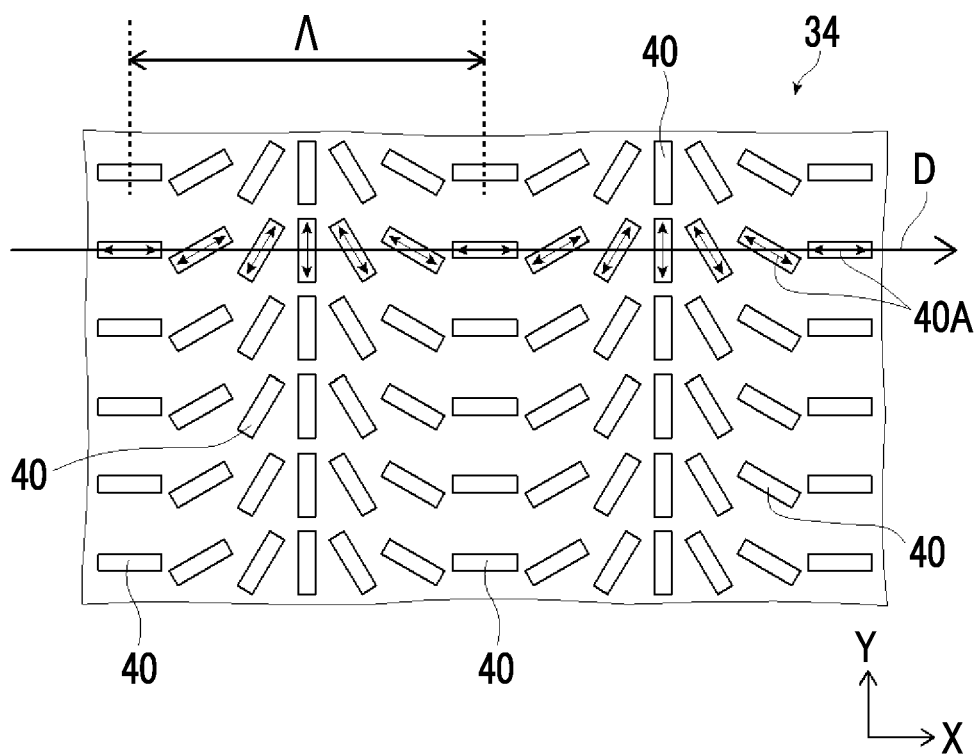
FIG. 10 is a plan view conceptually showing the liquid crystal layer shown in FIG. 9.

As shown in FIGS. 9 and 10, the cholesteric liquid crystal layer 34 is a layer obtained by cholesteric alignment of the liquid crystal compound. In addition, FIGS. 9 and 10 show an example in which the liquid crystal compound forming the cholesteric liquid crystal layer is a rod-like liquid crystal compound.

In the following description, the cholesteric liquid crystal layer will also be referred to as "liquid crystal layer."

The liquid crystal layer 34 is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 9, the liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch (pitch P), and plural pitches of the helically turned liquid crystal compound 40 are laminated.

As is well known, the cholesteric liquid crystalline phase exhibits selective reflectivity with respect to left or right circularly polarized light at a specific wavelength. Whether the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

A turning direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection range (circularly polarized light reflection range) where selective reflection is exhibited depends on $\Delta n$ of the cholesteric liquid crystalline phase and the helical pitch P and complies with a relationship of $\Delta\lambda=\Delta n\times P$. Therefore, the width of the selective reflection range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

Accordingly, regarding the wavelength of light that is reflected (diffracted) by the liquid crystal layer, the selective reflection wavelength range of the liquid crystal layer may be appropriately set, for example, by adjusting the helical pitch P of the liquid crystal layer.

The half-width of the reflection wavelength range is adjusted depending on the use of the liquid crystal layer and may be, for example, 10 to 500 nm and is preferably 20 to 300 nm and more preferably 30 to 100 nm.

As shown in FIG. 10, in the X-Y plane of the liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are aligned at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ-180° along the arrangement axis D. That is, in each of the plurality of liquid crystal compounds 40 arranged along the arrangement axis D, as shown in FIG. 10, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length A of the single period in the liquid crystal alignment pattern.

That is, a distance between centers of two liquid crystal compounds 40 in the arrangement axis D direction is the length A of the single period, the two liquid crystal compounds having the same angle in the arrangement axis D direction. Specifically, as shown in FIG. 10, a distance between centers in the arrangement axis D direction of two liquid crystal compounds 40 in which the arrangement axis D direction and the direction of the optical axis 40A match each other is the length A of the single period. In the following description, the length A of the single period will also be referred to as "single period Λ."

In the liquid crystal alignment pattern of the liquid crystal layer 34, the single period Λ is repeated in the arrangement axis D direction, that is, in the one in-plane direction in which the direction of the optical axis 40A changes while continuously rotating. In the liquid crystal diffraction element, the single period Λ is the period of the diffraction structure.

On the other hand, in the liquid crystal compound 40 forming the liquid crystal layer 34, the directions of the optical axes 40A are the same in the direction (in FIG. 10, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the arrangement axis D direction are the same in the Y direction.

Figure 11:
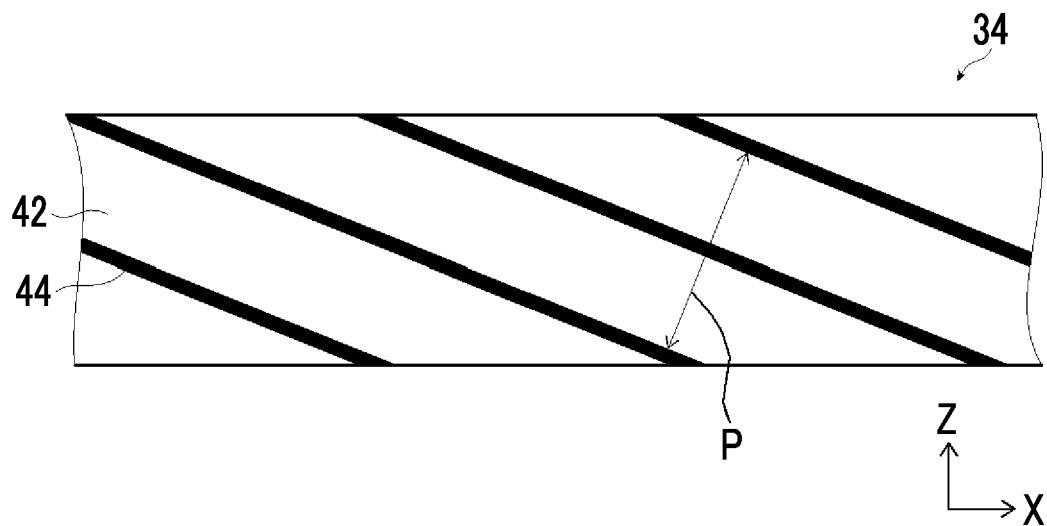
FIG. 11 is a diagram conceptually showing a cross-sectional scanning electron microscope (SEM) image of the liquid crystal layer shown in FIG. 9.
Figure 13:
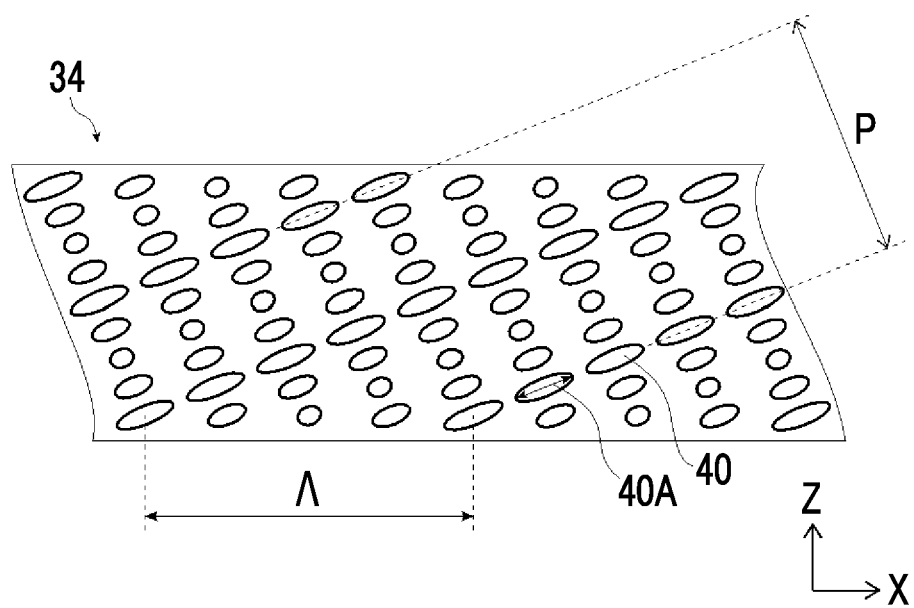
FIG. 13 is a diagram conceptually showing another example of the liquid crystal layer.

In a case where the X-Z plane of the liquid crystal layer 34 shown in FIG. 9 is observed with a scanning electron microscope (SEM), an arrangement direction in which bright portions 42 and dark portions 44 are alternately arranged as shown in FIG. 11, a stripe pattern tilted at a predetermined angle with respect to the main surface (X-Y plane) is observed. In this SEM cross-section, an interval between the bright portions 42 adjacent to each other or between the dark portions 44 adjacent to each other in a normal direction of lines formed by the bright portions 42 or the dark portions 44 substantially matches a ½ pitch. That is, as indicated by P in FIG. 11, two bright portions 42 and two dark portions 44 substantially match one helical pitch (one helical turn), that is, the pitch P. In a case where the tilt of the liquid crystal compound matches with the tilt of the bright portions and the dark portion as shown in FIG. 13, the helical pitch substantially matches the pitch P of the bright and dark lines shown in FIG. 11. In addition, in a case where the tilt of the liquid crystal compound does not match with the tilt of the bright portions and the dark portion as shown in FIG. 9, the helical pitch slightly deviates from the pitch P of the bright and dark lines shown in FIG. 11. However, the following description will be made without distinguishing between the helical pitch and the pitch of the bright and dark lines.

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 12:
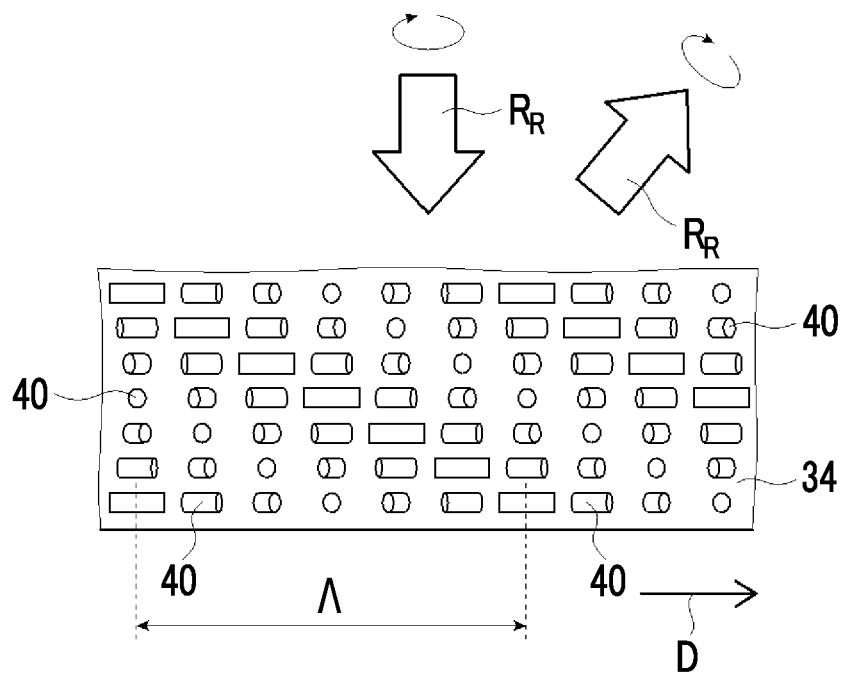
FIG. 12 is a conceptual diagram showing an action of the liquid crystal layer shown in FIG. 9.

On the other hand, the liquid crystal layer 34 reflects incident light in a state where it is tilted in the arrangement axis D direction with respect to the specular reflection. The liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 12.

For example, it is assumed that the liquid crystal layer 34 is a cholesteric liquid crystal layer that selectively reflects right circularly polarized light $R_R$ of red light. Accordingly, in a case where light is incident into the liquid crystal layer 34, the liquid crystal layer 34 reflects only right circularly polarized light $R_R$ of red light and allows transmission of the other light.

Here, in the liquid crystal layer 34, the optical axis 40A of the liquid crystal compound 40 changes while rotating in the arrangement axis D direction (the one in-plane direction).

The liquid crystal alignment pattern formed in the liquid crystal layer 34 is a pattern that is periodic in the arrangement axis D direction. Therefore, as conceptually shown in FIG. 12, the right circularly polarized light $R_R$ of red light incident into the liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the X-Y plane (the main surface of the cholesteric liquid crystal layer) in the arrangement axis D direction.

That is, the liquid crystal layer 34 can be used as a diffraction element that reflects (diffracts) incident light in a direction different from specular reflection.

In the liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

For example, in FIGS. 9 and 10, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

In the liquid crystal alignment pattern of the liquid crystal compound in the liquid crystal layer, the single period Λ as the length over which the optical axis of the liquid crystal compound rotates by 180° is the period (single period) of the diffraction structure. In addition, in the liquid crystal layer, the one in-plane direction (arrangement axis D direction) in which the optical axis of the liquid crystal compound changes while rotating is the periodic direction of the diffraction structure.

In the present invention, the length of the single period Λ of the diffraction element is not particularly limited and may be appropriately set depending on a desired diffraction angle and the like.

The length of the single period Λ is preferably 0.1 to 10 μm, more preferably 0.15 to 2 μm, and still more preferably 0.2 to 1 μm.

In the liquid crystal layer having the liquid crystal alignment pattern, as the single period Λ decreases, the angle of reflected light with respect to the incidence light increases. That is, as the single period Λ decreases, reflected light can be reflected in a state where it is largely tilted with respect to incidence light.

In addition, in the liquid crystal layer having the liquid crystal alignment pattern, the reflection angle (diffraction angle) of light varies depending on the wavelength of light to be reflected. Specifically, as the wavelength of light increases, the angle of reflected light with respect to incidence light increases.

In the example shown in FIG. 9, a configuration in which, on the X-Z plane of the liquid crystal layer 34, the optical axes 40A of the liquid crystal compound 40 are aligned to be parallel with respect to the main surface (X-Y plane) is adopted.

However, the present invention is not limited to this configuration. For example, as conceptually shown in FIG. 13, a configuration in which, on the X-Z plane of the liquid crystal layer 34, the optical axes 40A of the liquid crystal compound 40 are aligned to be tilted with respect to the main surface (X-Y plane) may be adopted.

In addition, the example shown in FIG. 13 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

Figure 14:
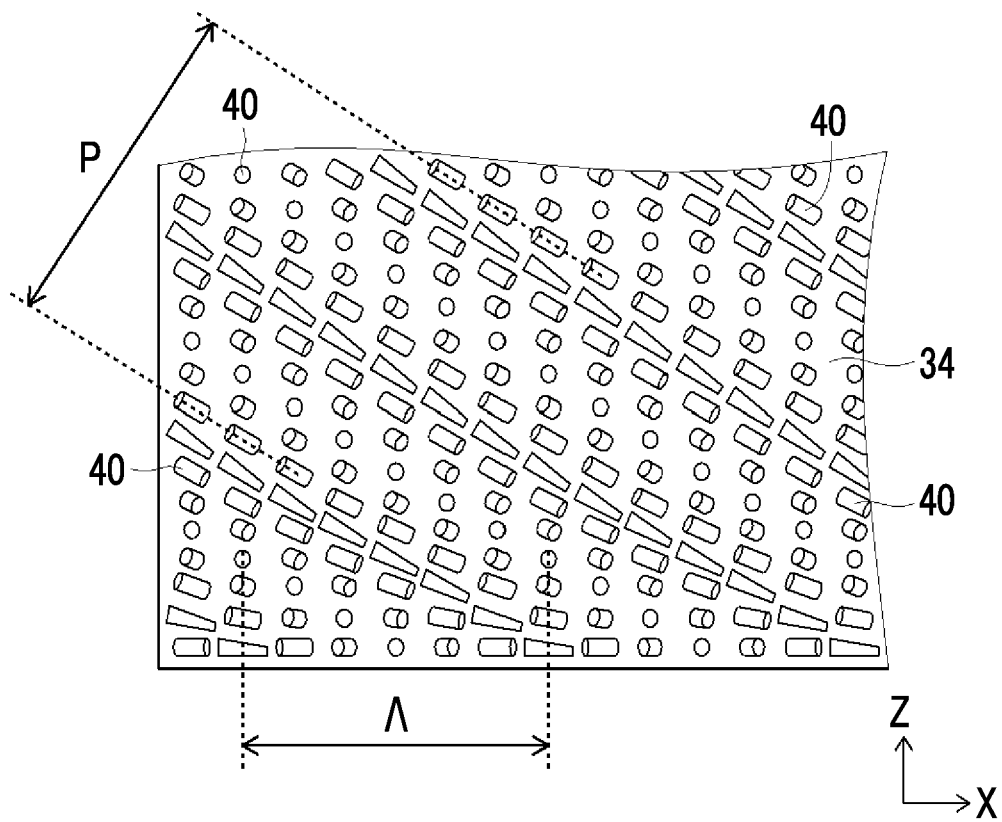
FIG. 14 is a diagram conceptually showing another example of the liquid crystal layer.

For example, in an example shown in FIG. 14, the optical axis 40A of the liquid crystal compound 40 at an interface of the liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface).

This way, the liquid crystal layer 34 may have a configuration in which the optical axis of the liquid crystal compound has a pretilt angle at one interface among the upper and lower interfaces or may have a pretilt angle at both the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 45° and more preferably 12° to 22°. The average tilt angle can be measured by observing the X-Z plane of the liquid crystal layer 34 with a polarization microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the liquid crystal layer 34 travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated with respect to an orientation in which light is diffracted is present as compared to a case where the liquid crystal compound is not tilted. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is preferable that the tilt angle is controlled by treating the interface of the liquid crystal layer 34.

By pretilting the photo-alignment film on the support side interface, the tilt angle of the liquid crystal compound can be controlled. For example, by exposing the photo-alignment film to ultraviolet light from the front and subsequently obliquely exposing the photo-alignment film during the formation of the photo-alignment film, the liquid crystal compound in the liquid crystal layer formed on the photo-alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired orientation in a case where light is diffracted in the direction.

Further, an additive for promoting the pretilt angle can also be added to the liquid crystal layer or to the photo-alignment film. In this case, the additive can be used as a factor for further improving the diffraction efficiency.

This additive can also be used for controlling the pretilt angle on the air side interface.

Here, in a cross-section of the liquid crystal layer 34 observed with a SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, and the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the optical axis tilt angle is 15° or more from the viewpoint that the direction of the liquid crystal compound matches the bright portions and the dark portions more suitably such that the diffraction efficiency can be improved.

The liquid crystal layer shown in FIG. 9 is a cholesteric liquid crystal layer. However, the liquid crystal layer prepared using the manufacturing method according to the embodiment of the present invention is not limited to this configuration.

Figure 15:
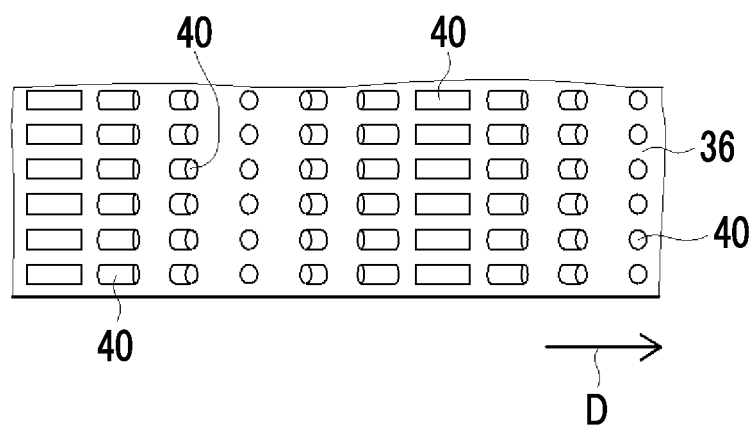
FIG. 15 is a diagram conceptually showing another example of the liquid crystal layer.
Figure 16:
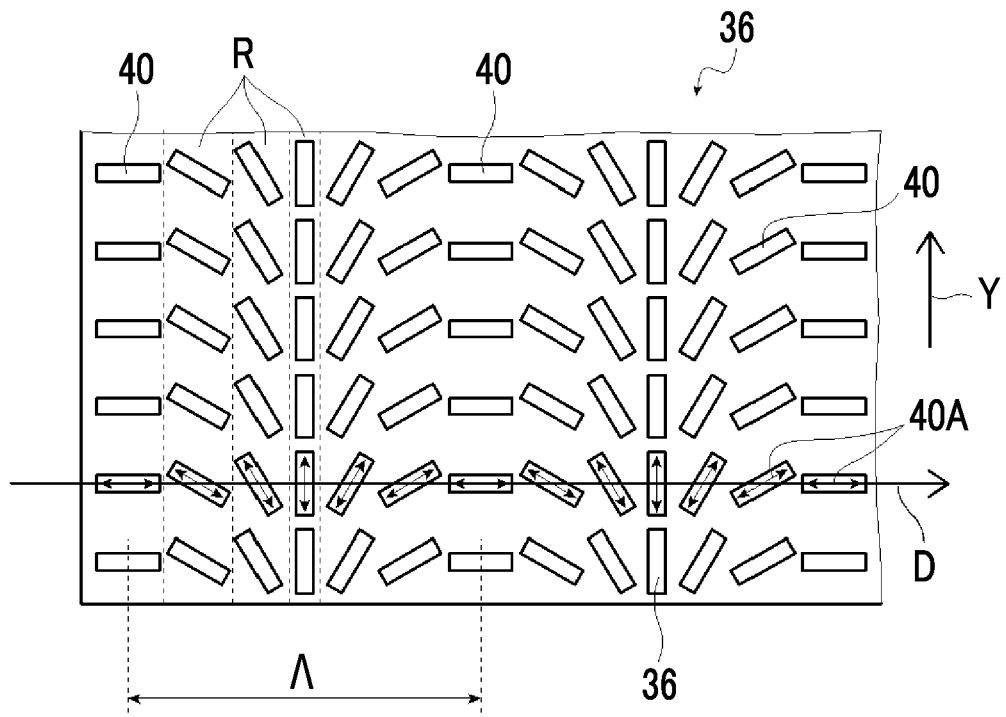
FIG. 16 is a diagram conceptually showing a plan view of the liquid crystal layer shown in FIG. 15.

FIGS. 15 and 16 show other examples of the liquid crystal layer prepared using the manufacturing method according to the embodiment of the present invention.

As in the cholesteric liquid crystal layer 34, as shown in FIG. 16, the liquid crystal layer 36 also has the liquid crystal alignment pattern in which the optical axis 40A of the liquid crystal compound 40 continuously rotates in the arrangement axis D direction. FIG. 16 also shows only the liquid crystal compound of the surface of the alignment film 32 as in FIG. 10.

As shown in FIG. 15, the liquid crystal compound 40 forming the liquid crystal layer 36 is not helically twisted and does not rotate in the thickness direction, and the optical axis 40A is positioned at the same position in the plane direction. The liquid crystal layer can be formed by not adding a chiral agent to a liquid crystal composition during the formation of the cholesteric liquid crystal layer. The liquid crystal layer may have a configuration in which the liquid crystal compound is helically twisted and rotates in the thickness direction to some extent that a cholesteric liquid crystalline phase is not formed.

As described above, the liquid crystal layer 36 has the liquid crystal alignment pattern in which the direction of the optical axis 40A derived from the liquid crystal compound 40 changes while continuously rotating in the arrangement axis D direction in a plane.

On the other hand, regarding the liquid crystal compound 40 forming the liquid crystal layer 36, the liquid crystal compounds 40 having the same direction of the optical axes 40A are arranged at regular intervals in the Y direction perpendicular to the arrangement axis D direction, that is, the Y direction perpendicular to the one in-plane direction in which the optical axis 40A continuously rotates.

In other words, regarding the liquid crystal compound 40 forming the liquid crystal layer 36, in the liquid crystal compounds 40 arranged in the Y direction, angles between the directions of the optical axes 40A and the arrangement axis D direction are the same.

In the liquid crystal compounds arranged in the Y direction in the liquid crystal layer 36, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound 40.

In a case where circularly polarized light is incident into the above-described liquid crystal layer 36, the light is refracted such that the direction of the circularly polarized light is converted.

Figure 17:
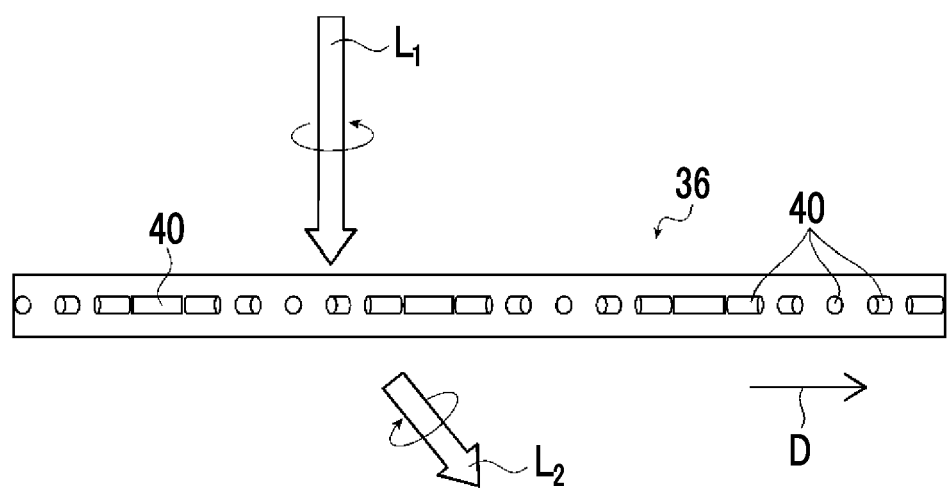
FIG. 17 is a diagram showing an action of the liquid crystal layer shown in FIG. 15.
Figure 18:
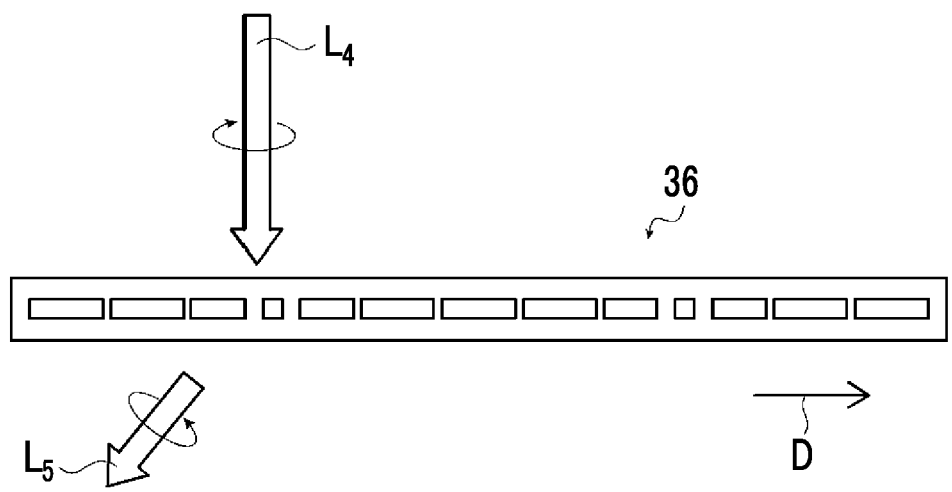
FIG. 18 is a diagram showing the action of the liquid crystal layer shown in FIG. 15.

This action is conceptually shown in FIGS. 17 and 18. In the liquid crystal layer 36, the value of the product of the difference in refractive index of the liquid crystal compound and the thickness of the optically-anisotropic layer is λ/2.

As shown in FIG. 17, in a case where the value of the product of the difference in refractive index of the liquid crystal compound in the liquid crystal layer 36 and the thickness of the optically-anisotropic layer is λ/2 and incidence light $L_1$ as left circularly polarized light is incident into the liquid crystal layer 36, the incidence light $L_1$ transmits through the liquid crystal layer 36 to be imparted with a phase difference of 180°, and the transmitted light $L_2$ is converted into right circularly polarized light.

In addition, the liquid crystal alignment pattern formed in the liquid crystal layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 18, in a case where the value of the product of the difference in refractive index of the liquid crystal compound in the liquid crystal layer 36 and the thickness of the optically-anisotropic layer is λ/2 and incidence light $L_4$ of right circularly polarized light is incident into the liquid crystal layer 36, the incidence light $L_4$ transmits through the liquid crystal layer 36 to be imparted with a phase difference of 180°, and the incidence light $L_4$ is converted into transmitted light $L_5$ of left circularly polarized light.

In addition, the liquid crystal alignment pattern formed in the liquid crystal layer 36 is a pattern that is periodic in the arrangement axis D direction. Therefore, the transmitted light $L_5$ travels in a direction different from a traveling direction of the incidence light $L_4$. In this case, the transmitted light $L_5$ travels in a direction different from the transmitted light $L_2$, that is, in a direction opposite to the arrow X direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

As in the cholesteric liquid crystal layer 34, by changing the single period Λ of the liquid crystal alignment pattern formed in the liquid crystal layer 36, refraction angles of the transmitted light components $L_2$ and $L_5$ can be adjusted. Specifically, even in the liquid crystal layer 36, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 15 and 16, the rotation direction of the optical axis 40A toward the arrangement axis D direction is clockwise. By setting this rotation direction to be counter-clockwise, the refraction direction of transmitted light can be reversed.

From the viewpoint of diffraction efficiency, it is preferable that the liquid crystal layer that allows transmission of incidence light and diffracts incidence light has a region where the liquid crystal compound is twisted and rotates (the twisted angle is less than 360°).

In addition, the liquid crystal layer having a region in which the liquid crystal compound is twisted and rotates (the twisted angle is less than 360°) without being cholesterically aligned can also be used as a reflective diffraction element. This diffraction element can also function as a reflective diffraction element in which diffracted light is reflected from an interface with the diffraction element and emitted from the light incidence side to reflect and diffract the light.

In addition, the liquid crystal layer 36 shown in FIG. 15 has a configuration in which the optical axis of the liquid crystal compound is parallel to the main surface of the liquid crystal layer, but the present invention is not limited thereto.

Figure 19:
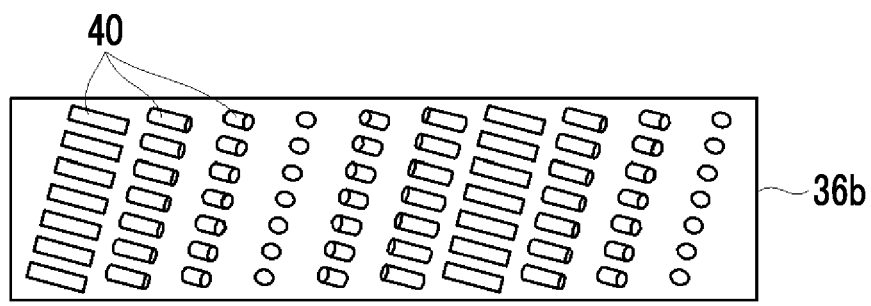
FIG. 19 is a diagram conceptually showing another example of the liquid crystal layer.

For example, as in a liquid crystal layer 36b shown in FIG. 19, in the above-described liquid crystal layer 36, the optical axis of the liquid crystal compound may be tilted with respect to the main surface of the liquid crystal layer. The liquid crystal layer 36b is the same as the liquid crystal layer 36 in that they have the liquid crystal alignment pattern in which the direction of the optical axis derived from the liquid crystal compound changes while continuously rotating in the one in-plane direction. That is, the plan view of the liquid crystal layer 36b is the same as that of FIG. 16.

Hereinabove, the method of manufacturing a liquid crystal layer according to the embodiment of the present invention has been described above. However, the present invention is not limited to the above-described examples, and various improvements and modifications may be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Photo-Alignment Film)

A glass substrate was used as the support (first support). The following coating liquid for forming a photo-alignment film was applied to the support using a spin coater at 2500 rpm for 30 seconds. The support on which the coating film of the coating liquid for forming a photo-alignment film was formed was dried using a hot plate at 60° C. for 60 seconds. As a result, a photo-alignment film was formed.

Coating Liquid for Forming Photo-Alignment Film

| The following material for photo-alignment | 1.00 part by mass |
|---|---|
| Water | 16.00 parts by mass |
| Butoxyethanol | 42.00 parts by mass |
| Propylene glycol monomethyl ether | 42.00 parts by mass |

Material for Photo-Alignment

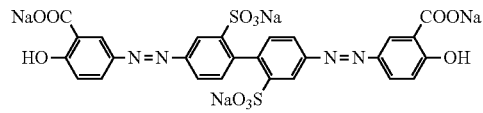

(Exposure of Photo-Alignment Film)

In an environment having a temperature of 25° C. and a relative humidity of 10%, the photo-alignment film was exposed using the exposure device shown in FIG. 2 to form a photo-alignment film P-1 having an alignment pattern.

In the exposure device, a laser that emits laser light having a wavelength (325 nm) was used as the laser. The exposure amount of the interference light was 3000 mJ/cm$^2$. The intersecting angle (intersecting angle $\alpha$) between two laser beams was 61.0°.

(Formation of Liquid Crystal Alignment Layer)

As a liquid crystal composition forming a liquid crystal alignment layer, the following liquid crystal composition LCMA-1 was prepared. The concentration of solid contents in the liquid crystal composition LCMA-1 was 15 wt %.

Liquid Crystal Composition LCMA-1

| The following liquid crystal compound L-1 | 100.00 parts by mass |
|---|---|
| The following polymerization initiator I-1 | 3.00 parts by mass |
| The following chiral agent Ch-1 | 6.20 parts by mass |
| Methyl ethyl ketone | 619.00 parts by mass |

Liquid Crystal Compound L-1

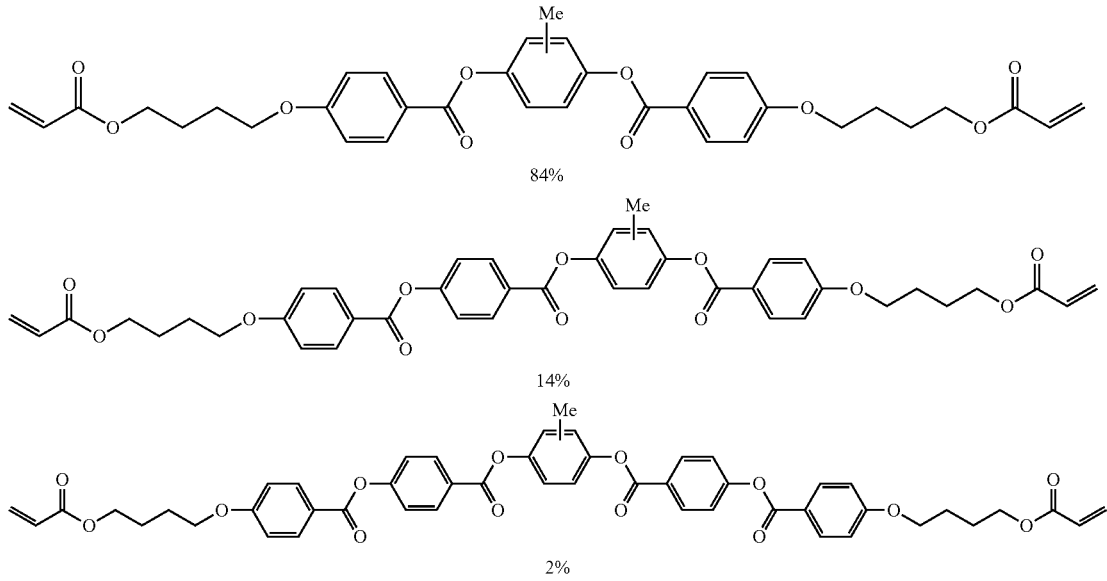

Polymerization Initiator I-1

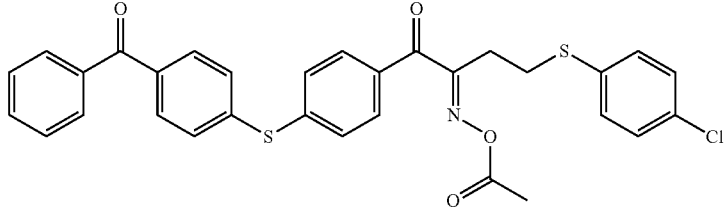 [SMILES: CC(=O)O/N=C(\CCSc1ccc(Cl)cc1)C(=O)c1ccc(Sc2ccc(C(=O)c3ccccc3)cc2)cc1]

Chiral Agent Ch-1

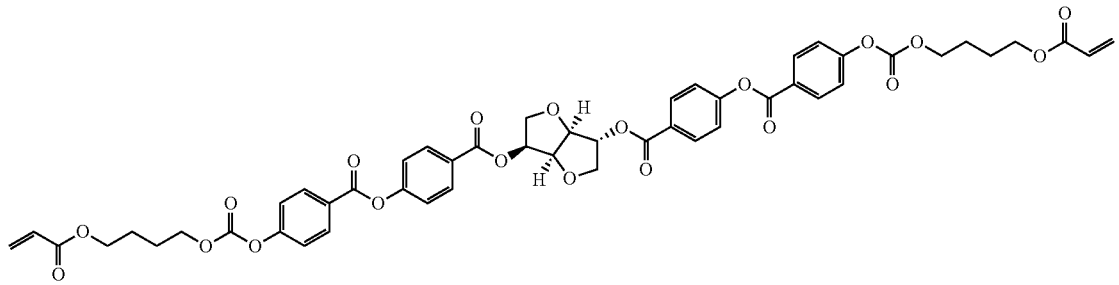 [SMILES: C=CC(=O)OCCCCOC(=O)Oc1ccc(C(=O)Oc2ccc(C(=O)O[C@H]3CO[C@@H]4[C@H]3OC[C@H]4OC(=O)c3ccc(OC(=O)c4ccc(OC(=O)OCCCCOC(=O)C=C)cc4)cc3)cc2)cc1]

In an environment between the exposure step of the alignment film to the liquid crystal layer application step, the temperature was 25° C. and the relative humidity was 10%.

The liquid crystal alignment layer was formed as follows.

The above-described liquid crystal composition LCMA-1 was applied to the photo-alignment film P-1 using a spin coater and rotated at 1000 rpm for 10 seconds. The coating film of the liquid crystal composition LCMA-1 was heated on a hot plate at 80° C. for 3 minutes (180 sec). Next, the coating film was irradiated with ultraviolet light having a wavelength of 365 nm at 80° C. at an irradiation dose of 500 mJ/cm$^2$ using a high-pressure mercury lamp in a nitrogen atmosphere. As a result, the liquid crystal composition LCMA-1 was cured, the alignment of the liquid crystal compound was immobilized, and a liquid crystal alignment layer MA-1 was formed.

A glass substrate where a pressure sensitive adhesive was provided that was separately provided was bonded to the obtained liquid crystal alignment layer MA-1, and the liquid crystal alignment layer MA-1 was peeled off from an interface with the photo-alignment film. An air interface of the peeled liquid crystal alignment layer MA-1 was an interface in contact with the photo-alignment film.

(Formation of Cholesteric Liquid Crystal Layer)

As the liquid crystal composition forming the cholesteric liquid crystal layer, the following liquid crystal composition LC-1 was prepared. The concentration of solid contents in the liquid crystal composition LC-1 was 35 wt %.

Liquid Crystal Composition LC-1

| | |
|---|---|
| The above-described liquid crystal compound L-1 | 100.00 parts by mass |
| The above-described polymerization initiator I-1 | 3.00 parts by mass |
| The above-described chiral agent Ch-1 | 6.20 parts by mass |
| Methyl ethyl ketone | 202.99 parts by mass |

The cholesteric liquid crystal layer was formed as follows. As described above, in the environment until the liquid crystal composition for forming the liquid crystal layer was applied to the liquid crystal alignment layer, the temperature was 25° C. and the relative humidity was 10%.

The above-described liquid crystal composition LC-1 was applied to the liquid crystal alignment layer MA-1 using a spin coater and rotated at 1000 rpm for 10 seconds. The coating film of the liquid crystal composition LC-1 was heated on a hot plate at 80° C. for 3 minutes (180 sec). Next, the coating film was irradiated with ultraviolet light having a wavelength of 365 nm at 80° C. at an irradiation dose of 500 mJ/cm$^2$ using a high-pressure mercury lamp in a nitrogen atmosphere. As a result, the liquid crystal composition LC-1 was cured, the alignment of the liquid crystal compound was immobilized, and a cholesteric liquid crystal layer was formed.

The obtained cholesteric liquid crystal layer was transferred to another glass substrate and was separated at an interface with the liquid crystal alignment layer MA-1. Concurrently, the liquid crystal alignment layer MA-1 was reproduced.

The prepared cholesteric liquid crystal layer was cut in a direction along the rotation direction of the optical axis, and a cross-section was observed with a SEM. By analyzing the SEM image, the single period Λ of the liquid crystal alignment pattern was measured. The single period Λ was 0.32 μm.

The number of times the cholesteric liquid crystal layer was able to be prepared from the single liquid crystal alignment layer was evaluated, and the result thereof was five.

Example 2

A liquid crystal alignment layer MA-2 was prepared using the same method as that of Example 1, except that the following liquid crystal composition LCMA-2 was used as a liquid crystal composition forming the liquid crystal alignment layer. The concentration of solid contents in the liquid crystal composition LCMA-2 was 20 wt %.

Liquid Crystal Composition LCMA-2

| | |
|---|---|
| The above-described liquid crystal compound L-1 | 100.00 parts by mass |
| The above-described polymerization initiator I-1 | 3.00 parts by mass |
| Methyl ethyl ketone | 437.00 parts by mass |

The preparation and the separation of the cholesteric liquid crystal layer were repeated using the same method as that of Example 1, except that the liquid crystal alignment layer MA-2 was used. The single period Λ in the liquid crystal alignment pattern of the obtained optical element was 0.32 μm as in Example 1.

The number of times the cholesteric liquid crystal layer was able to be prepared from the single liquid crystal alignment layer was evaluated, and the result thereof was five.

Comparative Example 1

As in Example 1, the photo-alignment film P-1 was exposed by interference exposure at an intersecting angle (intersecting angle α) of 61.0° between two laser beams. The liquid crystal composition LCMA-2 was applied to the exposed photo-alignment film P-1 using the same method as that of Example 2, and was heated and irradiated with ultraviolet light to cure the liquid crystal composition LCMA-2 using the same method as that of Example 1.

As a peelable layer, UV-curable PDMS (X-34-4184A, X-34-4184B; manufactured by Shin-Etsu Chemical Co., Ltd.) diluted to 10 times by decamethylcyclopentasiloxane was applied to the cured liquid crystal composition LCMA-2 (liquid crystal alignment layer), and was rotated using a spin coater at 3000 rpm for 10 seconds.

Next, the coating film was irradiated with ultraviolet light having a wavelength of 365 nm at an irradiation dose of 500 mJ/cm$^2$ using a high-pressure mercury lamp in a nitrogen atmosphere. As a result, the peelable layer was immobilized.

The preparation of the cholesteric liquid crystal layer and the separation of the cholesteric liquid crystal layer were repeated using the same method as that of Example 1, except that the cholesteric liquid crystal layer was formed on the peelable layer. As a result, alignment defects were present in the prepared cholesteric liquid crystal layer, and thus an appropriate cholesteric liquid crystal layer was not able to be prepared. Accordingly, the number of times the cholesteric liquid crystal layer was able to be prepared from the single liquid crystal alignment layer was zero.

As can be seen from the above results, the effects of the present invention are obvious.

The present invention is suitably applicable to preparation of liquid crystal layers used for various uses where light is refracted in an optical device, for example, a diffraction element that causes light to be incident into a light guide plate of AR glasses or emits light to the light guide plate.

EXPLANATION OF REFERENCES

30: support
32: alignment film
33: liquid crystal alignment layer
34, 36, 36b: liquid crystal layer
35: adherend
40: liquid crystal compound
40A: optical axis
42: bright portion
44: dark portion
60: exposure device
62: laser
64: light source
65: $\lambda/2$ plate
68: polarization beam splitter
70A, 70B: mirror
72A, 72B: $\lambda/4$ plate
$R_R$: right circularly polarized light of red light
M: laser light
MA, MB: beam
$P_O$: linearly polarized light
$P_R$: right circularly polarized light
$P_L$: left circularly polarized light
$L_1$, $L_4$: incidence light
$L_2$, $L_5$: transmitted light
D: arrangement axis
Λ: single period
P: pitch

What is claimed is:

1. A method of manufacturing a liquid crystal layer comprising:
an alignment film forming step of forming an alignment film on a support;
a liquid crystal alignment layer alignment step of laminating a first liquid crystal composition including a polymerizable liquid crystal compound on the alignment film and aligning the first liquid crystal composition;
a liquid crystal alignment layer forming step of polymerizing the aligned first liquid crystal composition to form a liquid crystal alignment layer;
a peeling step of laminating and immobilizing a surface of the liquid crystal alignment layer opposite to the alignment film on an adherend and peeling the liquid crystal alignment layer from the alignment film at an interface between the liquid crystal alignment layer and the alignment film;
a liquid crystal layer alignment step of laminating a second liquid crystal composition including a polymerizable liquid crystal compound on a surface of the liquid crystal alignment layer from which the alignment film is peeled off and aligning the second liquid crystal composition;
a liquid crystal layer forming step of polymerizing the aligned second liquid crystal composition to form a liquid crystal layer; and
a liquid crystal layer separation step of separating the formed liquid crystal layer from the liquid crystal alignment layer,
wherein the liquid crystal layer alignment step to the liquid crystal layer separation step are repeated to repeatedly prepare the liquid crystal layer.

2. The method of manufacturing a liquid crystal layer according to claim 1,
wherein in the liquid crystal layer alignment step, the liquid crystal alignment layer brings a direction of an optical axis derived from the liquid crystal compound in the liquid crystal layer into an alignment state of changing while continuously rotating in at least one in-plane direction.

3. The method of manufacturing a liquid crystal layer according to claim 1,
wherein the alignment film formed in the alignment film forming step is formed of a photo-alignment composition including an azobenzene compound.

4. The method of manufacturing a liquid crystal layer according to claim 1,
wherein in the alignment film forming step, the alignment film is exposed by laser interference exposure.

5. The method of manufacturing a liquid crystal layer according to claim 1,
wherein the first liquid crystal composition includes a polyfunctional polymerizable compound.

6. The method of manufacturing a liquid crystal layer according to claim 5,
wherein the polymerizable liquid crystal compound in the first liquid crystal composition is a polyfunctional polymerizable liquid crystal compound.

7. The method of manufacturing a liquid crystal layer according to claim 2,
wherein the alignment film formed in the alignment film forming step is formed of a photo-alignment composition including an azobenzene compound.

8. The method of manufacturing a liquid crystal layer according to claim 2,
wherein in the alignment film forming step, the alignment film is exposed by laser interference exposure.

9. The method of manufacturing a liquid crystal layer according to claim 2,
wherein the first liquid crystal composition includes a polyfunctional polymerizable compound.

10. The method of manufacturing a liquid crystal layer according to claim 9,
wherein the polymerizable liquid crystal compound in the first liquid crystal composition is a polyfunctional polymerizable liquid crystal compound.

11. The method of manufacturing a liquid crystal layer according to claim 3,
wherein in the alignment film forming step, the alignment film is exposed by laser interference exposure.

12. The method of manufacturing a liquid crystal layer according to claim 3,
wherein the first liquid crystal composition includes a polyfunctional polymerizable compound.

13. The method of manufacturing a liquid crystal layer according to claim 12,
wherein the polymerizable liquid crystal compound in the first liquid crystal composition is a polyfunctional polymerizable liquid crystal compound.

14. The method of manufacturing a liquid crystal layer according to claim 4,
wherein the first liquid crystal composition includes a polyfunctional polymerizable compound.

15. The method of manufacturing a liquid crystal layer according to claim 14,
wherein the polymerizable liquid crystal compound in the first liquid crystal composition is a polyfunctional polymerizable liquid crystal compound.

* * * * *